United States Patent
Ito et al.

(10) Patent No.: US 7,176,638 B2
(45) Date of Patent: Feb. 13, 2007

(54) DISCHARGE LAMP LIGHTING CIRCUIT

(75) Inventors: Masayasu Ito, Shizuoka (JP); Shinji Ohta, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 294 days.

(21) Appl. No.: 10/385,679

(22) Filed: Mar. 12, 2003

(65) Prior Publication Data

US 2003/0209993 A1 Nov. 13, 2003

(30) Foreign Application Priority Data

Mar. 12, 2002 (JP) .................................. P.2002-066828

(51) Int. Cl.
*G05F 1/00* (2006.01)

(52) U.S. Cl. .................. 315/307; 315/219; 315/244; 315/224; 315/209 R; 315/308; 315/DIG. 7

(58) Field of Classification Search ............... 315/219, 315/387, 224, 291, 209 R, 244, 308, 82, 315/DIG. 7
See application file for complete search history.

(56) References Cited

U.S. PATENT DOCUMENTS 5,449,973 A * 9/1995 Yamashita et al. ............ 315/82

6,127,788 A * 10/2000 Yamamoto et al. ......... 315/307
6,208,089 B1   3/2001 Ito et al.
6,294,879 B1 *  9/2001 Nagase et al. ........... 315/209 R
6,340,870 B1   1/2002 Yamashita et al.

FOREIGN PATENT DOCUMENTS

DE   195 32 165 A1   3/1996
EP   0 644 709 B1    3/1995
FR   2 698 515 A1    5/1994

* cited by examiner

*Primary Examiner*—Haissa Philogene
(74) *Attorney, Agent, or Firm*—Sughrue Mion, PLLC

(57) ABSTRACT

A discharge lamp lighting circuit has a structure of a voltage resonance type including a transformer and a switching element to be provided on a primary side thereof as a DC—DC converting circuit for converting a DC input voltage into a desirable DC voltage. The lighting circuit further includes a control circuit serving to ON/OFF control the switching element, thereby controlling an output voltage Vout of the DC—DC converting circuit, and has a function of a current limitation related to the switching element. In the lighting circuit, if the output voltage Vout is raised, a current flowing to the switching element is limited to be decreased. Consequently, a voltage applied to the switching element can be suppressed, and furthermore, the winding ratio of the transformer does not need to be increased. Accordingly, it is possible to prevent an electrical efficiency from being deteriorated.

6 Claims, 10 Drawing Sheets

TIME PASSAGE SECTION

TIME PASSAGE SECTION

DISCHARGE LAMP LIGHTING CIRCUIT

BACKGROUND OF THE INVENTION

1. Field of the Invention

The present invention relates to a discharge lamp lighting circuit, and more particularly to a discharge lamp lighting circuit operable to control the current limitation of a switching element provided on the primary side of a transformer in the discharge lamp lighting circuit comprising a DC—DC converting circuit having a flyback type structure.

2. Description of the Related Art

There is known a structure in which a DC—DC converting circuit, a DC-AC converting circuit and a starting circuit are provided in the lighting circuit of a discharge lamp, such as a metal halide lamp. For example, a PWM (pulse width modulation) method and a PFM (pulse frequency modulation) method have been known as a control method of a switching power circuit constituting a DC—DC converting circuit (a DC—DC converter)

In the PWM method, an ON/OFF ratio or a duty ratio (or a duty cycle) for a switching element constituting a DC—DC converting circuit can be variably controlled to change an output voltage. In the PFM method, moreover, a frequency related to the ON/OFF control of the switching element can be variably controlled to change an output voltage.

A structure of a flyback type is used for the DC—DC converting circuit, for example, in which a semiconductor switching element is connected to the primary winding side of a transformer for conversion to carry out the ON/OFF control of the same element and a rectifier diode and a smoothing capacitor are provided on the secondary side of the transformer.

In the case in which a structure of a voltage resonance type is employed in the flyback type circuit (converter), an inductor is connected as an inductive element to the primary winding of a transformer in series and a capacitor is connected as a capacitive element to a switching element in parallel, for example. Consequently, the breakdown voltage of the switching elements causes a problem.

In the structure of a voltage resonance type, although it is possible to produce an advantage that a loss in the switching element can be decreased, there is a drawback that the breakdown voltage of the switching element is required. For example, in the use of an FET, a drain—source voltage is increased more than that in the case in which the inductive element and the capacitive element are not provided.

By taking, as an example, the lighting circuit of a small-sized discharge lamp (a rated power of 35W) to be used for the light source of a lighting unit for a car, the output voltage of a circuit to be applied before turning ON the discharge lamp is generally set to be approximately 350 to 400 V. Accordingly, it is necessary to select a switching element having a very high breakdown voltage.

For this problem, for example, there can be proposed a method of increasing the winding ratio of a transformer. However, this produces a result contrary to an original purport that a power loss is reduced in the case in which an electrical efficiency is deteriorated by an increase in the value of a current (a primary current value) flowing to the primary winding of the transformer and the switching element. Moreover, when the primary current value is increased, a resonance energy is increased so that a resonance voltage is raised.

It is an object of the invention to provide a discharge lamp lighting circuit comprising a DC—DC converting circuit having a flyback type structure in which the breakdown voltage of a switching element provided on the primary side of a transformer can be reduced and the electrical efficiency of the circuit can be prevented from being deteriorated by the reduction.

SUMMARY OF THE INVENTION

In order to solve the aforementioned deficiencies in the related art, the invention provides a discharge lamp lighting circuit having a structure of a voltage resonance type including a transformer and a switching element to be provided on a primary side thereof as a DC—DC converting circuit for converting a voltage input from a DC power supply into a desirable DC voltage, and comprising a control circuit serving to ON/OFF control the switching element, thereby controlling an output voltage of the DC—DC converting circuit, and having a function of a current limitation related to the switching element, wherein the output voltage of the DC—DC converting circuit is detected and a current flowing to the switching element is limited to be decreased when the output voltage is raised.

According to the invention, therefore, when the output voltage of the DC—DC converting circuit is raised, the degree of the current limitation to the switching element is increased so that the voltage applied to the element can be suppressed. For this reason, moreover, it is not necessary to increase the winding ratio of the transformer. Consequently, it is possible to prevent an electrical efficiency from being deteriorated.

DETAILED DESCRIPTION OF THE INVENTION

Figure 1:
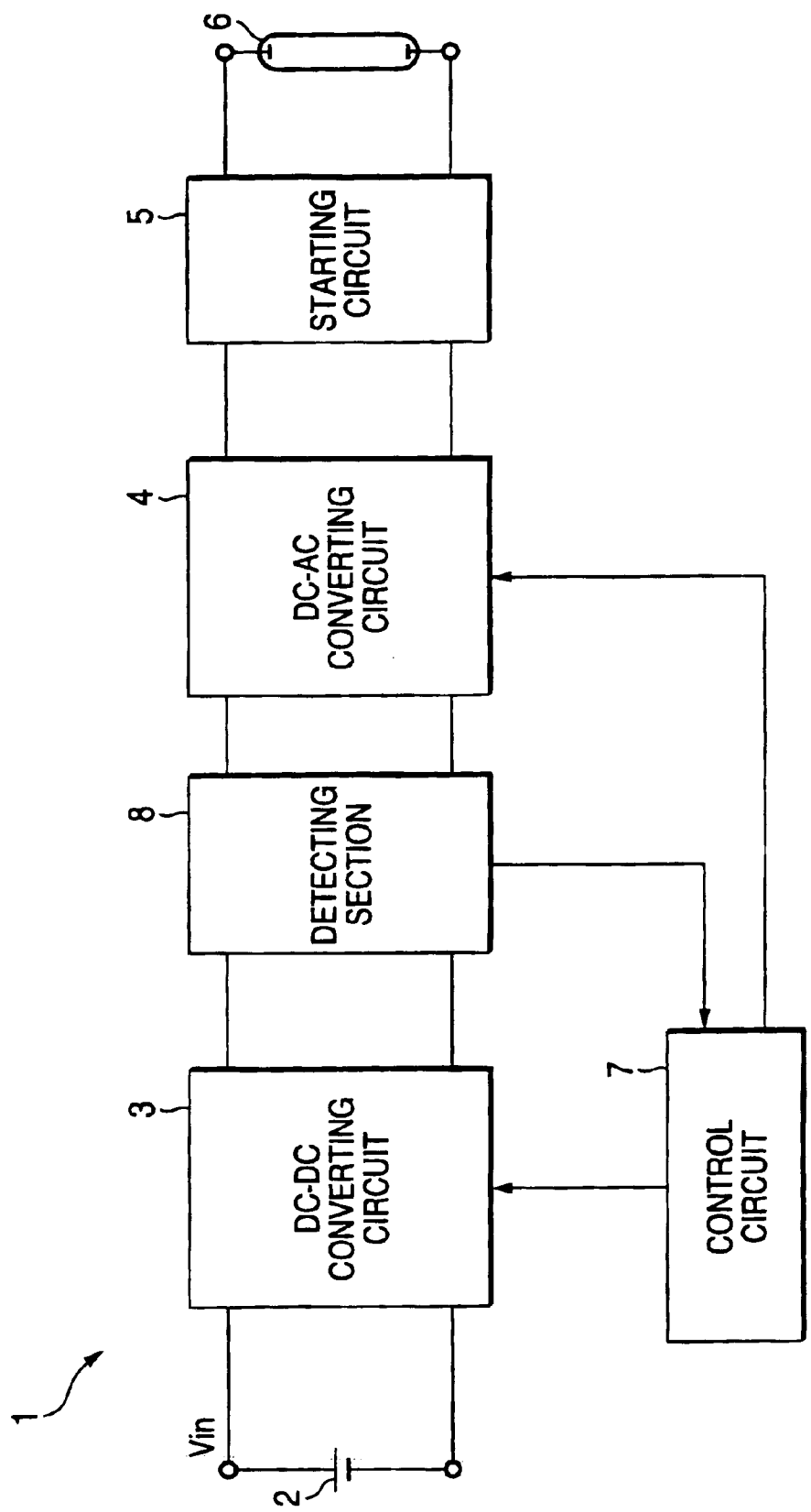
FIG. 1 is a diagram showing an example of the basic structure of a discharge lamp lighting circuit according to the invention.

FIG. 1 shows the basic structure of a lighting circuit according to the invention. As shown in FIG. 1, a discharge lamp lighting circuit 1 comprises a DC power supply 2, a DC—DC converting circuit 3, a DC-AC converting circuit 4, a starting circuit 5 and a control circuit 7.

The DC—DC converting circuit 3 serves to receive a DC input voltage (which will be referred to as "Vin") from the DC power supply 2 and to convert the same DC input voltage into a desirable DC voltage, and a flyback type DC—DC converter of a voltage resonance type is used for the DC—DC converting circuit 3.

The DC-AC converting circuit 4 is provided for converting the output voltage of the DC—DC converting circuit 3 into an AC voltage and then supplying the same AC voltage to a discharge lamp 6 through the starting circuit 5. For example, the DC-AC converting circuit 4 comprises a full-bridge type circuit using four semiconductor switching elements and a driving circuit thereof, and serves to contrarily ON/OFF control two pairs of switching elements, thereby outputting an AC voltage.

The starting circuit (a so-called starter) 5 is provided for generating a high voltage pulse signal for starting (a pulse for starting) with respect to the discharge lamp 6 to start up the discharge lamp 6 and the same signal is superposed on the AC voltage output from the DC-AC converting circuit 4 and is applied to the discharge lamp 6.

The control circuit 7 serves to control a power given to the discharge lamp 6 and to control the output of the DC—DC converting circuit 3 upon receipt of a detection signal for a voltage applied to the discharge lamp 6 and a current flowing to the discharge lamp 6 or a voltage and a current which correspond thereto. For example, the control circuit 7 sends a control signal to the DC—DC converting circuit 3 and controls an output voltage thereof in order to control a power to be supplied corresponding to the state of the discharge lamp 6 upon receipt of a signal sent from a detecting section 8 for detecting the output voltage or current of the DC—DC converting circuit 3. The control circuit 7 also serves to raise the voltage to be supplied to the discharge lamp 6 to have a certain level before turning ON the discharge lamp 6, thereby carrying out output control for reliably turning ON the discharge lamp 6. Moreover, a PWM method and a PFM method may be used as a switching control method.

Figure 2:
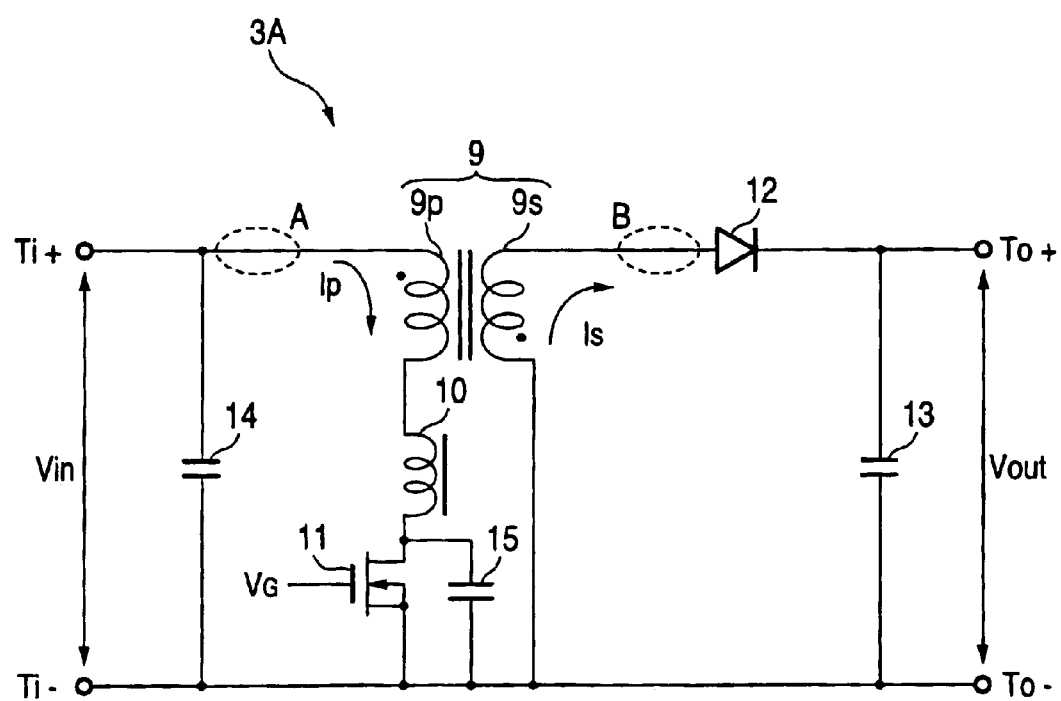
FIG. 2 is a circuit diagram showing an example of the structure of a DC—DC converting circuit.
Figure 3:
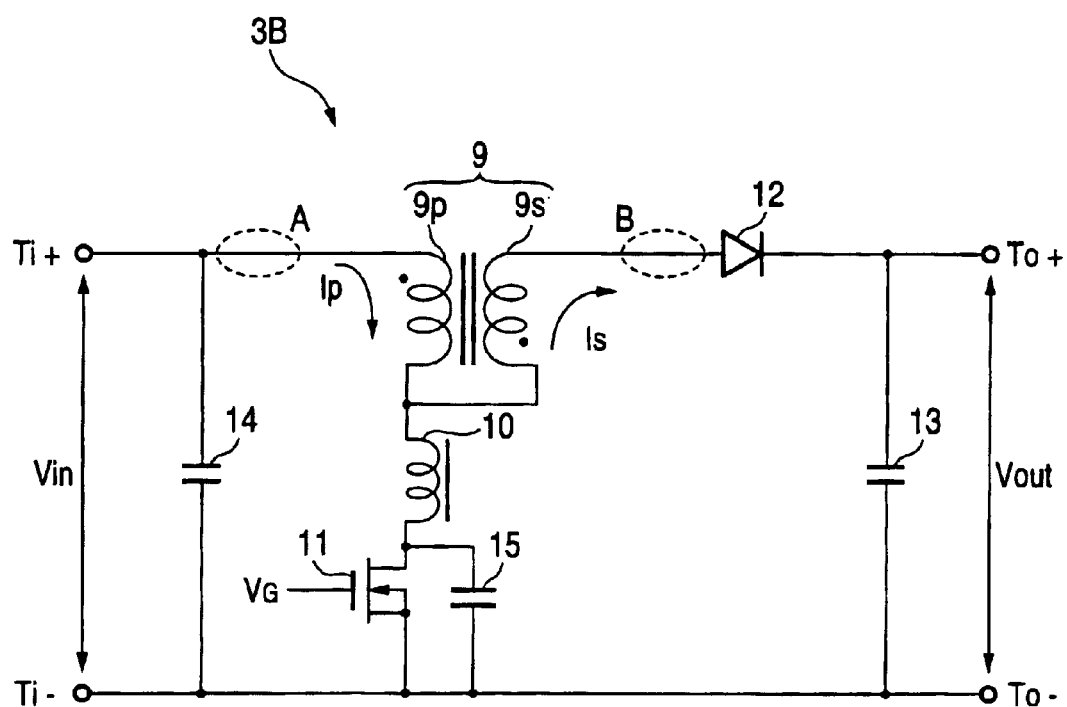
FIG. 3 is a circuit diagram showing an example of a different structure from that of FIG. 2 for the DC—DC converting circuit.

FIGS. 2 and 3 show basic circuits for a voltage resonance of a flyback type. They are different from each other in that the primary and secondary sides of the transformer are connected to each other or not (i.e., they are of an insulating type or not). For example, it is possible to produce an advantage that an electrical efficiency, that is, the rate of an output power to an input power is increased if one of the ends of a primary winding is connected to that of a secondary wiring as shown in FIG. 3. On the other hand, since a lower voltage than the input voltage cannot be output, a configuration is to be determined in consideration of their futures.

Also in any configuration, the following elements may be provided (numerals in parentheses indicate designations).

transformer (9),
inductor (10),
switching element (11),
rectifier diode (12), and
smoothing capacitor (13).

Terminals "Ti$^+$" and "Ti$^-$" shown in the drawing denote input terminals, and the DC input voltage "Vin" is supplied thereto and a capacitor 14 is provided therebetween. Moreover, "To$^+$" and "To$^-$" denote output terminals, and an output voltage (which will be referred to as "Vout") obtained after voltage conversion is sent to a latter stage circuit (the DC-AC converting circuit)

The black circle in the drawings at each winding of the transformer 9 indicates a winding start.

In an example 3A of a structure shown in FIG. 2 (the primary and secondary windings of the transformer are not directly connected to each other), the inductor 10 is connected in series to the winding end side of a primary winding 9p of the transformer 9 and the switching element 11 is connected to the inductor 10. A signal is supplied from the control circuit 7 (see FIG. 1) to the switching element 11. In the drawing, an N-channel MOSFET (field effect transistor) is used for the switching element 11, and a drain thereof is connected to the primary winding 9p of the transformer 9 through the inductor 10 and the source of the FET is connected to the input terminal "Ti$^-$".

A capacitor 15 is provided between the source and the drain in the FET. The capacitor 15 may be connected as a separate element to the FET or a parasitic capacitance in the FET may be utilized.

The rectifier diode 12 and the smoothing capacitor 13 are provided on the secondary side of the transformer 9, and one of the ends (a winding termination end) of a secondary winding 9s of the transformer 9 is connected to the a node of the rectifier diode 12 and the other end (a winding start end) of the secondary winding 9s is connected to a line coupling the terminals "Ti$^-$" and "To$^-$". The cathode of the rectifier diode 12 is connected to the terminal "To$^+$" and one of the ends of the smoothing capacitor 13. The smoothing capacitor 13 is provided between the output terminals "To$^+$" and "To$^-$" and a voltage on both ends of the capacitor 13 is output as Vout.

In the drawing, "Ip" denotes a primary side current of the transformer 9 and "Is" denotes a secondary side current of the transformer 9, and "VG" denotes a gate signal voltage to be applied to the FET.

In the example shown in the drawing, the inductor 10 is provided between the primary winding 9p of the transformer 9 and the switching element 11, which is not restricted. There may also be proposed a configuration in which the inductor 10 is provided between the terminal Ti$^+$ and the primary winding 9p (see an A portion indicated by a circle shown in a broken line of the drawing) or is provided between the secondary winding 9s and the rectifier diode 12 (see a B portion indicated by a circle shown in a broken line of the drawing) and a configuration in which the leakage inductance of the transformer is utilized.

In an example 3B of the structure shown in FIG. 3, most of portions have the same structures as those of FIG. 2 except that the primary and secondary windings of the transformer 9 are connected to each other at respective ends. More specifically, a terminal on the winding termination side of the primary winding 9p is connected to one of the ends (the winding start end) of the secondary winding 9s and is connected to the inductor 10, and is connected to the switching element 11 through the inductor 10.

In the same manner as in the example of FIG. 2, the inductor 10 is provided between the primary winding 9p of the transformer 9 and the switching element 11, which is not restricted. There may be proposed a configuration in which the inductor 10 is provided between the terminal Ti$^+$ and the primary winding 9$p$ (see an A portion indicated by a circle shown in a broken line of the drawing) or is provided between the secondary winding 9$s$ and the rectifier diode 12 (see a B portion indicated by a circle shown in a broken line of the drawing) and a configuration in which the leakage inductance of the transformer is utilized.

In both of the structures shown in FIGS. 2 and 3, in the voltage resonance type, a voltage or a current is resonated by the inductor 10 and the capacitor 15 to turn ON or OFF the switching element 11 (the FET in this example) when a voltage applied to the same element 11 is zero volt so that a power loss generated in switching can be decreased (a switching loss can be reduced).

There may arise problem in that the voltage applied to the switching element 11, that is, a drain—source voltage (VDS) in the FET is raised. More specifically, by taking, as an example, the structure in which the inductor 10 and the conductor 15 are not provided in FIGS. 2 and 3, when an output voltage Vout is set to be 100V, an input voltage Vin is set to be 10V and a winding ratio of the transformer 9 is set to be "1:2" (or a winding ratio=1/2 is set), the calculated value of the drain—source voltage of the FET is obtained as "VDS=10+(100−10)/3=40V". On the other hand, the resonance voltages of the inductor 10 and the capacitor 15 are added to 40V in the voltage resonance type using the inductor 10 and the capacitor 15. Therefore, there is a possibility that VDS might exceed 100V depending on circumstances.

From the equation for VDS, the value of VDS is increased when the output voltage Vout is raised. Accordingly, it is necessary to select a switching element having a high breakdown voltage. For example, in a lighting circuit in the case in which a discharge lamp (a metal halide lamp) for the light source of a lighting unit for a car is used, a voltage of several hundred volts is generally supplied before turning ON the discharge lamp at time of start-up thereof. In consideration of this matter, it is necessary to use a switching element having a very high breakdown voltage.

In order to reduce the breakdown voltage of the switching element, there may also be proposed a method of increasing the winding ratio of the transformer and a bad effect caused by the method cannot be disregarded. For example, the duty cycle (ON duty) of the switching element is reduced and a current on the primary side of the transformer and a current flowing to the switching element are excessively increased based on the relationship between the input-output voltage and the winding ratio. As a result, there may be a problem in that an electrical efficiency is deteriorated (an expected object to reduce a power loss cannot be obtained so that advantages are reduced).

Moreover, when the current flowing to the switching element is increased, a resonance energy is increased and a resonance voltage is also raised.

Therefore, the invention has an object to drop a voltage applied to the switching element to reduce the breakdown voltage of the same element without increasing the winding ratio of the transformer (that is, without reducing an electrical efficiency), thereby using an inexpensive element.

As described above, the control circuit 7 is provided in order to control the output voltage of the DC—DC converting circuit 3 by ON/OFF controlling the switching element 11. The output voltage Vout of the DC—DC converting circuit 3 is detected and carries out a limitation to decrease a current flowing to the switching element if the output voltage Vout is high. In other words, in the case in which the output voltage Vout is higher as compared with a limited current value related to the switching element set when the output voltage Vout is low, it is preferable that the limited current value should be set to be low.

As a method of limiting a current flowing to the switching element, there is known a so-called pulse-by-pulse method for a countermeasure to prevent the overcurrent breakdown of the switching element.

For example, when an FET (a field effect transistor) is used as the switching element, and a current flowing to the FET is set to be "I" and the resistance value of a resistance for current detection which is provided for detecting the value is set to be "R", "I·R" is obtained as a detection value by voltage conversion. In the switching control of the FET, when a current limitation level is set to be "Vlim", the detection level of the current I is prevented from exceeding Vlim. In otherwords, the limitation is reduced if the current limitation level Vlim is defined to have a great value, and the limitation is increased if the current limitation level Vlim is defined to have a small value (Accordingly, in the case in which the value of the current I is to be decreased, it is preferable that the value of Vlim should be decreased to have a necessary level. Consequently, it is possible to prevent the heat generation of the element.).

By using this method, the output voltage Vout is detected and the limited current value (the current limitation level Vlim) can be set to be small (the current limitation can be increased) if the value is great. Of course, this method can be applied after turning ON the discharge lamp, and is effective also in case of application before turning ON the discharge lamp. Moreover, when the polarity of the output voltage of the DC-AC converting circuit 4 is switched (particularly, in the case in which a large current flows to the discharge lamp at time of the application of a great load immediately after the discharge lamp is turned ON), the polarity of a voltage or a current applied to the discharge lamp is inverted by switching the polarity so that a resonance current flows and the output voltage Vout of the DC—DC converting circuit is raised. Correspondingly, it is preferable that the degree of a current limitation should be defined. The raised voltage is generated naturally or intentionally (for example, if the inductance value of the starting circuit is increased and the electrostatic capacity of the smoothing capacitor is set to be small, it is possible to reduce the frequency of extinction of the discharge lamp which is generated in the polarity inversion).

In FIGS. 4 to 7, an axis of abscissa indicates the output voltage Vout and an axis of ordinate indicates a limitation current value of the current Ip on the primary side or the current limitation level "Vlim", and their relationship is illustrated.

Figure 4:
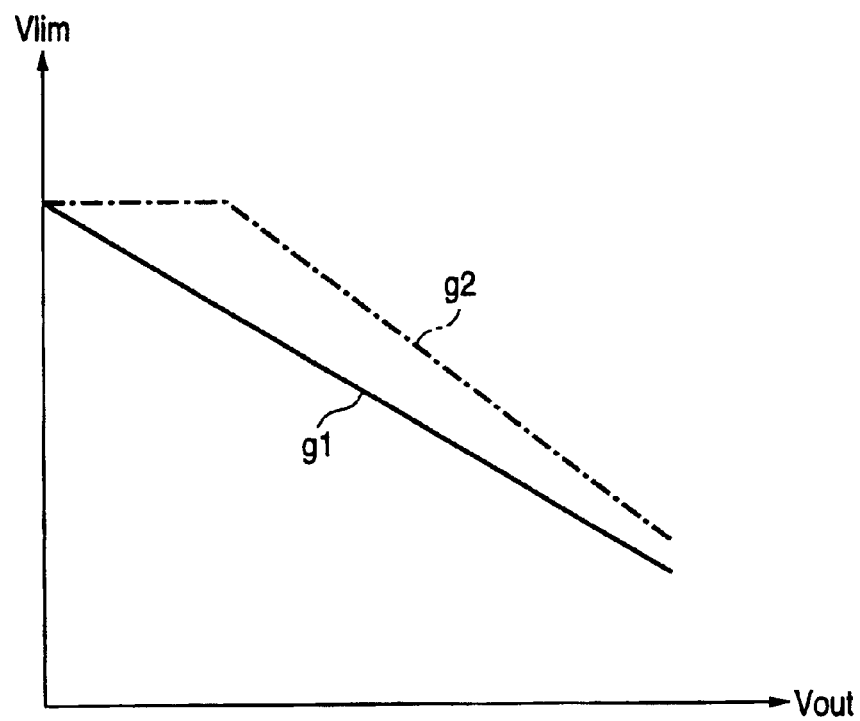
FIG. 4 is a graph for explaining an example of control related to a current limitation.
Figure 5:
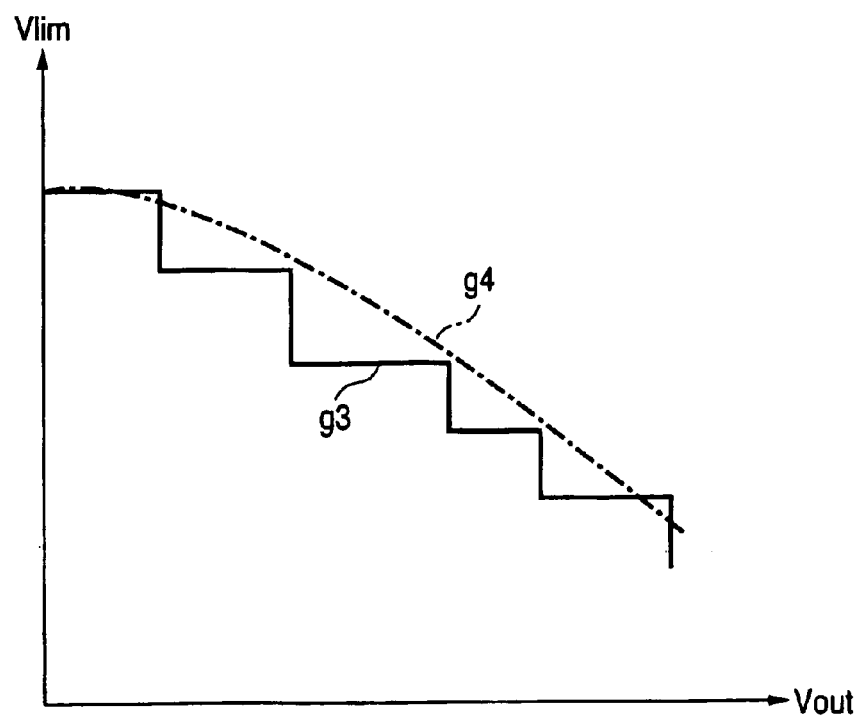
FIG. 5 is a graph for explaining a different example from that of FIG. 4 for the control related to the current limitation.

In an example of FIG. 4, the following configuration is shown.

A configuration in which Vlim is reduced with an increase in the output voltage Vout as in a right downward graph curve g1 shown in a solid line; and A configuration in which Vlim is set to be constant irrespective of the value of the output voltage Vout within a constant range related to Vout and Vlim is reduced with an increase in Vout in the case in which Vout is increased out of the same range as in a graph curve g2 shown in a one-dotted chain line.

While there is shown an example in which Vlim is rectilinearly reduced with an increase in the output voltage Vout in the graph curve g1, it is not restricted. There can be proposed an example in which Vlim is reduced stepwise with an increase in the output voltage Vout as in a graph curve g3 shown in a solid line of FIG. 5 and an example in which Vlim is reduced like a curve with an increase in the output voltage Vout as in a graph curve g4 shown in a one-dotted chain line of FIG. 5.

Figure 6:
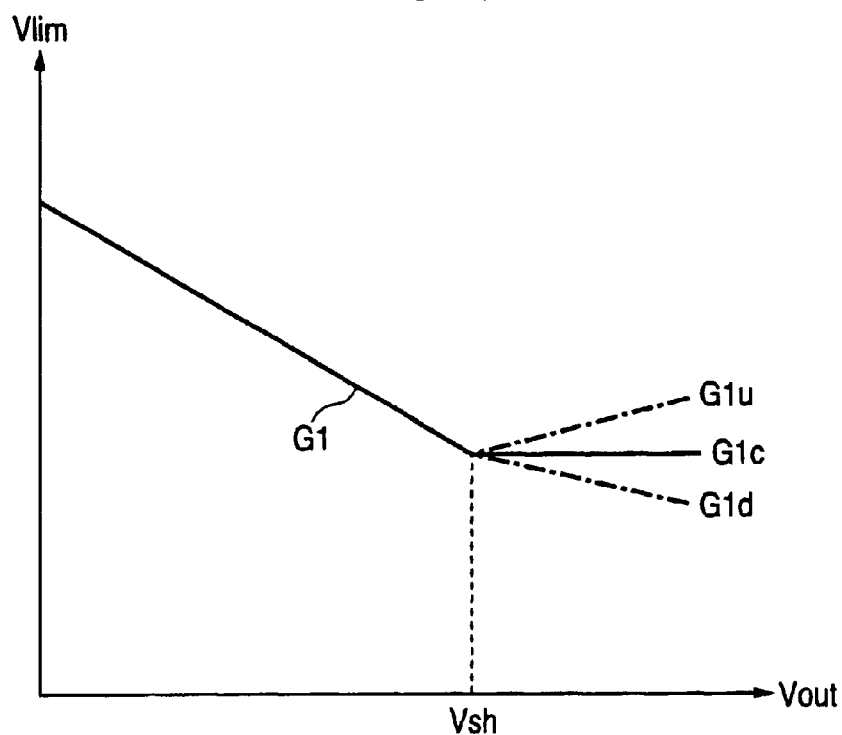
FIG. 6 is a graph showing an example in which the example of the control in FIG. 4 is changed within such a range as to exceed a threshold.
Figure 7:
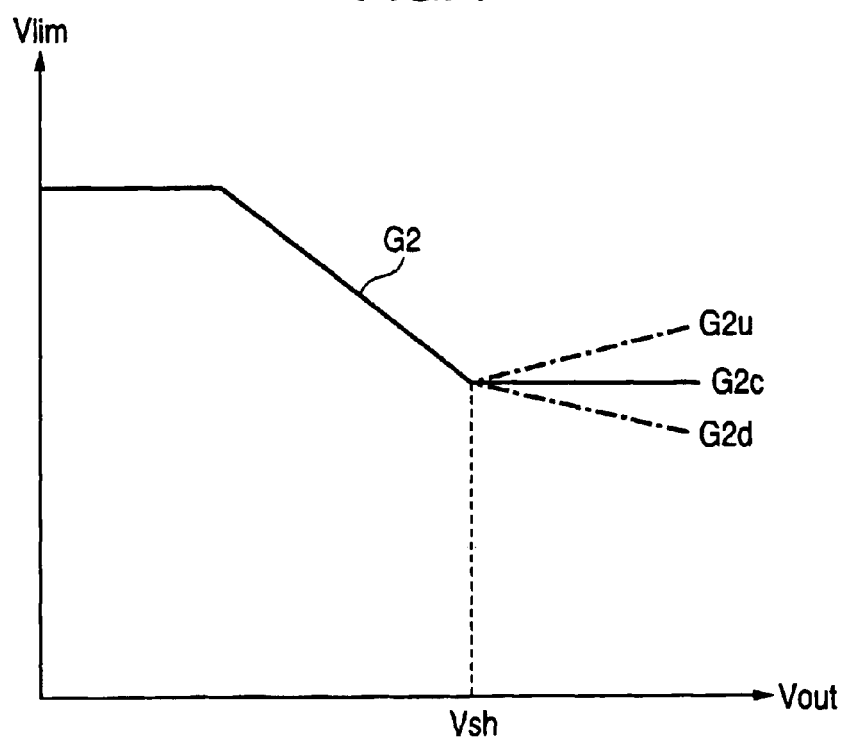
FIG. 7 is a graph showing an example in which the example of the control in FIG. 5 is changed within such a range as to exceed a threshold.

In the examples of FIGS. 6 and 7, a characteristic is varied by setting a predetermined threshold related to Vout (which will be referred to as "Vsh") as a boundary.

A graph curve G1 shown in FIG. 6 has the same characteristic as the graph curve g1 within a range of "Vout☐Vsh", and Vlim is set to be constant as shown in a G1c portion within such a range that the value of Vout exceeds Vsh. Alternatively, it is also possible to have a characteristic in which an inclination is more relieved as compared with the inclination of the graph within the range of "Vout☐Vsh" (an absolute value is small and a change is carried out with a negative inclination) as shown in a two-dotted chain line G1d within a range of "Vout>Vsh" or Vlim is increased with a positive inclination when Vout is increased within the range of "Vout>Vsh" as shown in a one-dotted chain line G1u.

A graph curve G2 shown in FIG. 7 has the same characteristic as the graph curve g2 within a range of "Vout☐Vsh", and Vlim is set to be constant as shown in a G2c portion within such a range that the value of Vout exceeds Vsh. Alternatively, it is also possible to have a characteristic in which an inclination is more relieved as compared with the inclination of the graph within the range of "Vout☐Vsh" (an absolute value is small and a change is carried out with a negative inclination) as shown in a two-dotted chain line G2d within a range of "Vout>Vsh" or Vlim is increased with a positive inclination when Vout is increased within the range of "Vout>Vsh" as shown in a one-dotted chain line G2u.

In the example shown in FIG. 4, Vlim is reduced with an increase in Vout. For this reason, there is a possibility that a necessary voltage (approximately 350 to 400 V) might not be reached before a discharge lamp is turned ON if the value is excessively decreased (a limitation is excessively increased). In the case in which the value of the output voltage Vout exceeds a certain threshold, therefore, the degree of a current limitation may be set to be constant or relieved as shown in the examples of FIGS. 6 and 7.

In a transition state in which a source voltage for control rises, moreover, a control operation is unstable. Also at this time, there is a possibility that the value of VDS might be increased. Consequently, the Vlim may be set to be small to increase the limitation.

Figure 8:
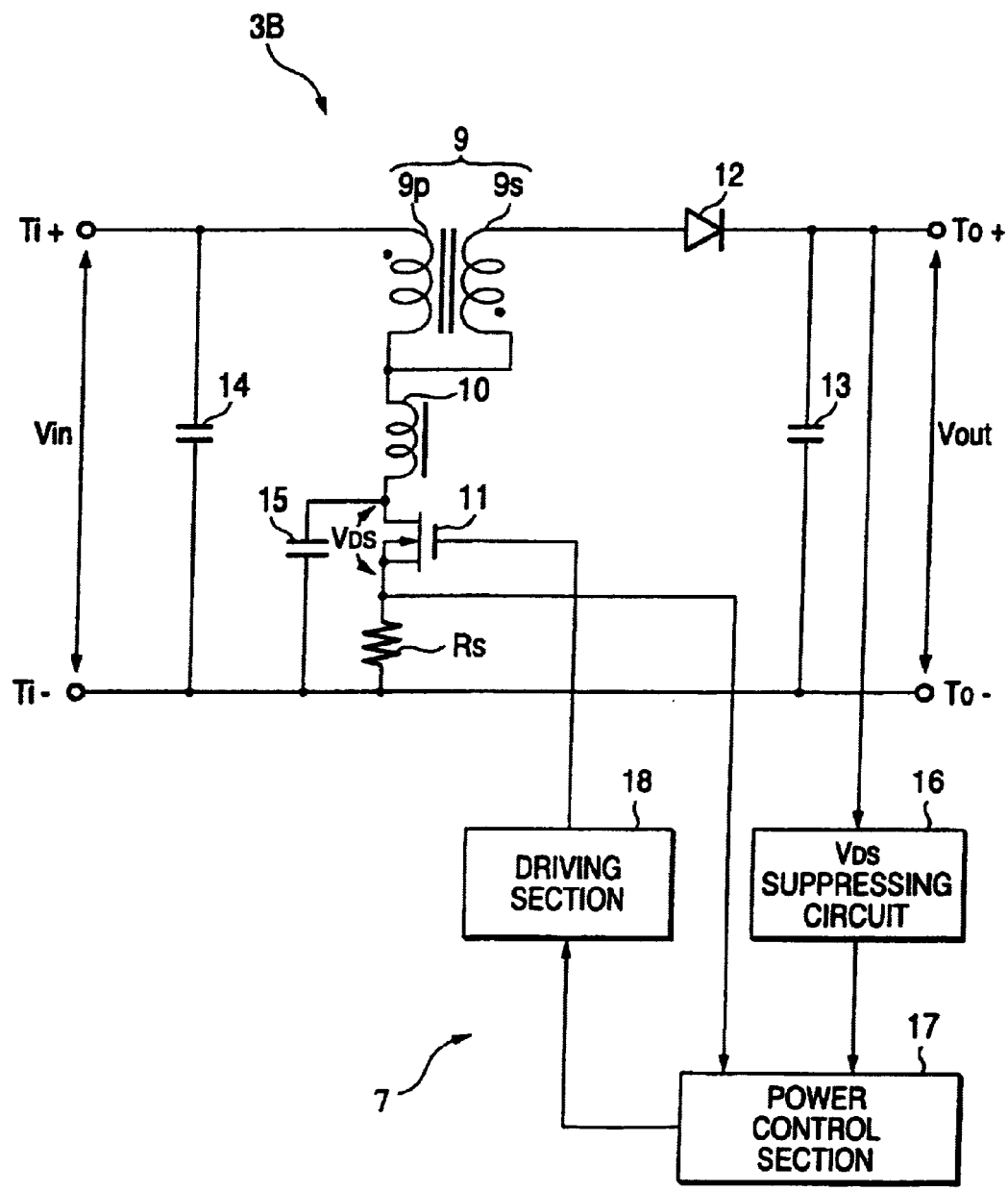
FIG. 8 is a diagram showing the main part of a control structure.

Referring to the control, for example, the control circuit 7 is constituted to have the following components as shown in FIG. 8 (numerals in parentheses indicate designations).

VDS suppressing circuit (16),
power control section (17), and
driving section (18).

In this example, the configuration in FIG. 3 is employed.

The VDS suppressing circuit 16 is provided as a voltage suppressing circuit for suppressing a rise in a voltage applied to the switching element 11 (or an overvoltage suppressing circuit), and serves to detect an output voltage Vout and to send an output signal thereof to the power control section 17 (a structure is described below).

The power control section 17 serves to control the driving operation of the switching element 11 through the driving section 18 and to control a power to be supplied to a discharge lamp by the variable control of the output voltage Vout. The power control section 17 comprises a driving circuit having a current limiting function of the pulse-by-pulse type (for example, an IC for PWM control or an IC for PFM control), and a limited current value is defined in response to a signal sent from the VDS suppressing circuit 16.

The driving section 18 is provided for driving the switching element 11 upon receipt of a signal sent from the power control section 17 and a complementary pair formed by a transistor is used.

Figure 9:
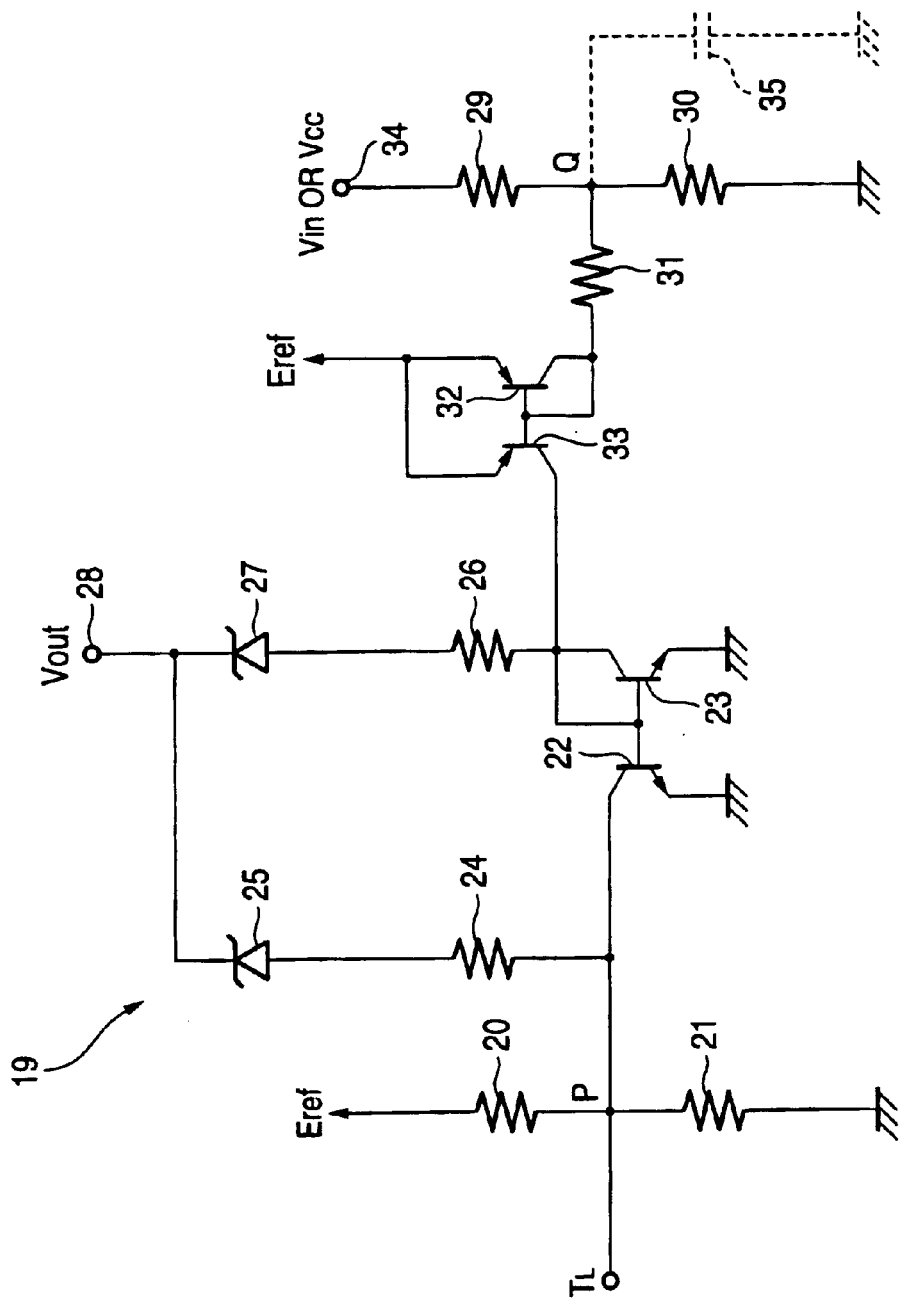
FIG. 9 is a circuit diagram showing an example of the structure of a VDS suppressing circuit.

FIG. 9 shows an example 19 of the structure of the VDS suppressing circuit 16.

A terminal "TL" shown in the drawing is a reference terminal (a terminal defining Vlim) of the limited current, and corresponds to a limited current reference input terminal in the case in which the same terminal is provided in a general-purpose IC (an IC for PWM) having a pulse-by-pulse type current limiting function in a configuration using the same IC, for example. Alternatively, the terminal corresponds to an internal terminal of an IC in a custom-made integrated circuit. In any case, when a voltage value supplied to the reference terminal is decreased, Vlim is reduced (the structure is known in the related art, and description therefore will be omitted)

While a voltage obtained by dividing a predetermined reference voltage "Eref" by resistors 20 and 21 is supplied to the terminal "TL", the voltage is influenced by a circuit section positioned on the right side.

In NPN transistors 22 and 23 constituting a current mirror circuit, a resistor 24 and a Zener diode 25 are connected to the collector of the transistor 22 and Vout is supplied, and furthermore, a resistor 26 and a Zener diode 27 are connected to the collector of the transistor 23 and Vout is supplied. In other words, the cathode of each of the Zener diodes is connected to a detecting terminal 28 of Vout and each anode is connected to the collector of each of the corresponding transistors through each resistor.

Referring to the Zener diode 27, a Zener voltage is set to have a predetermined value, for example, 100 V. Therefore, when Vout exceeds the threshold of 100 V, the Zener diode 27 is conducted to serve to drop a defined voltage applied to the voltage dividing resistors 20 and 21 (a voltage on a node "P" in the voltage dividing resistor). Referring to the Zener diode 25, moreover, a Zener voltage is set to have a predetermined value, for example, 270 V. Therefore, when Vout exceeds the threshold of 270 V, the Zener diode 25 is conducted to serve to drop a defined voltage applied to the voltage dividing resistors 20 and 21 (since a current limitation is relieved by setting a resistance value, the value of a voltage (an open-circuit voltage) supplied before turning ON a discharge lamp can be maintained). Accordingly, this example corresponds to a characteristic including a G2d portion in the graph curve G2 of FIG. 7.

A portion constituted by a current mirror circuit formed by voltage dividing resistors 29 and 30, a resistor 31 and PNP transistors 32 and 33 is provided for a current limitation at an early stage of the rise of a power supply for control. More specifically, the resistors 29 and 30 are connected in series to a terminal 34 for supplying Vin or a voltage "Vcc" generated by a power circuit which is not shown, and their resistance voltage dividing values are supplied to the bases of the transistors 32 and 33 and the emitter of the transistor 32 through the resistor 31. The predetermined reference voltage Eref is supplied to the emitter of each of the transistors and the collector of the transistor 33 is connected to the collector of the transistor 23. Accordingly, a current flows to the current mirror circuit to reduce the electric potential of the node P while a value of Vin or Vcc is small (a current limitation is increased until a supply voltage rises to have a normal value)

In this circuit, it is possible to implement characteristics in various configurations depending on the presence of the Zener diodes 25 and 27 or a change in constant values such as their Zener voltages and the resistance values of the resistors 24 and 26. In FIG. 9, moreover, when a capacitor 35 shown in a broken line is connected to a voltage dividing point shown in a point "Q" (a node of the resistors 29 and 30) (in parallel with the resistor 30), a time at an early stage of the rise of Vin or Vcc can be regulated (by a time constant circuit formed by the resistor 30 and the capacitor 35).

In case of a general-purpose IC, all the elements shown in the drawing are provided as external components. In a custom-made integrated circuit, an element exceeding the breakdown voltage of the circuit, a Zener diode and a capacitor are provided as external components.

Referring to a method of detecting a current flowing to the switching element 11, moreover, a resistor for detection (a shunt resistor) is generally used. While the detection signal of a resistor Rs for detection which is connected to the switching element 11 is sent to the power control section 17 as shown in FIG. 8, any method can be used in the invention.

Figure 10:
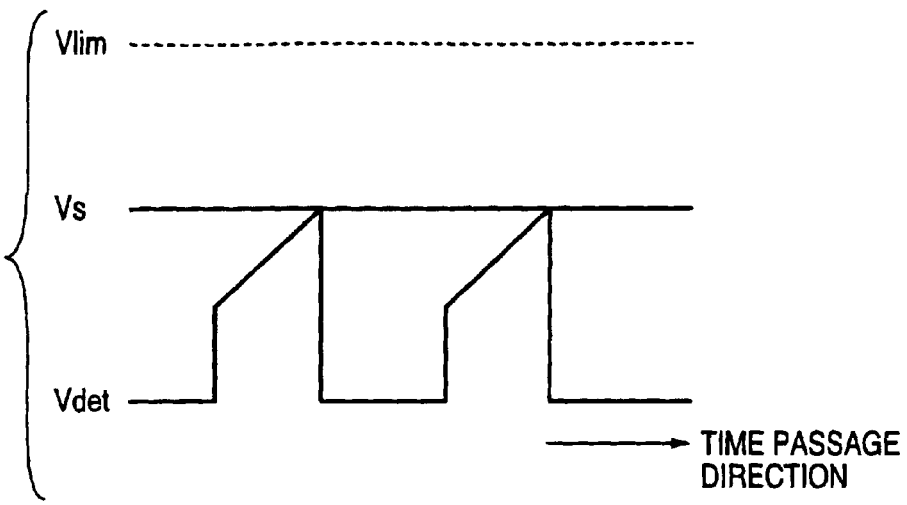
FIG. 10 is a diagram for explaining the current limitation of a switching element together with FIGS. 11 and 12, showing a state in which a control level is lower than a limited current.
Figure 11:
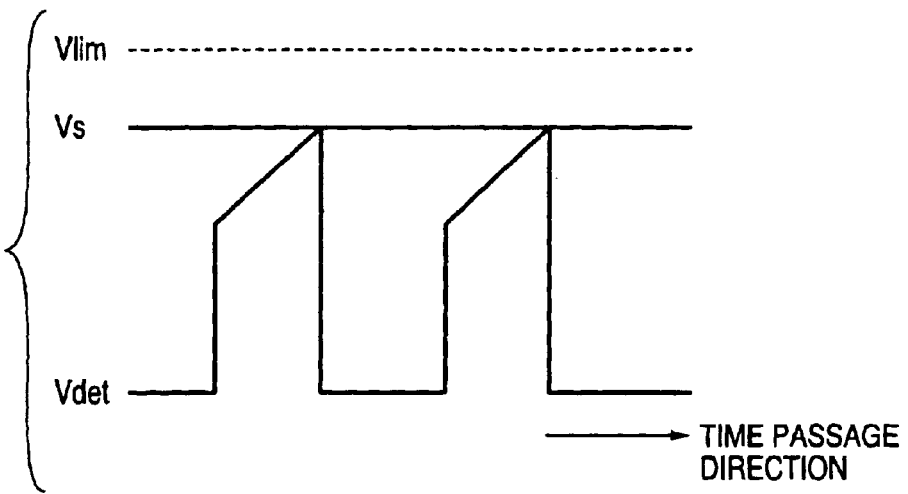
FIG. 11 is a diagram showing a state in which the control level is higher than that in the case of FIG. 10.
Figure 12:
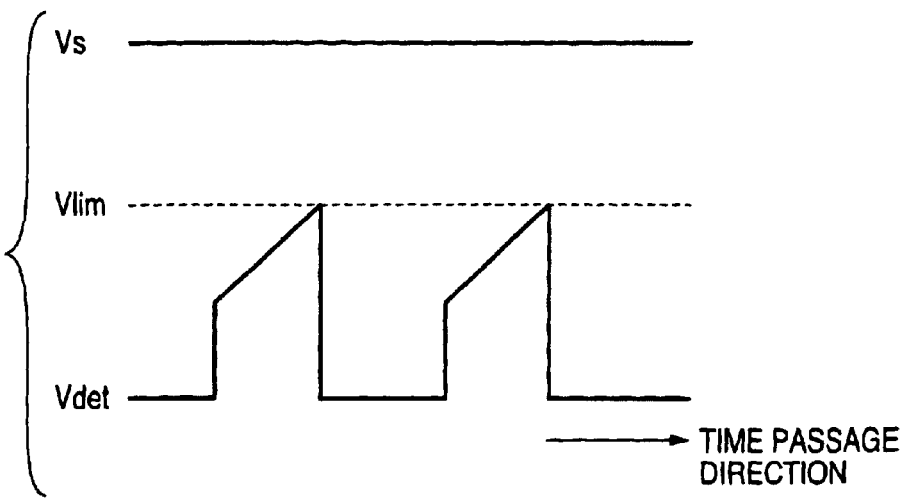
FIG. 12 is a diagram showing a state in which the limited current is lower than the control level.

FIGS. 10 to 12 are schematic waveform diagrams for explaining an operation related to a current limitation, in which symbols shown in the drawings have the following meaning.

"Vs"=level of control signal, and

"Vdet"=level of detection signal of current flowing to the switching element 11.

Vlim corresponds to the electric potential of the terminal "TL", and the control signal Vs is generated based on the detection signal of a voltage or a current of a discharge lamp by a calculating circuit for power control which is not shown. A current and a power to be output to the discharge lamp are to be defined to be increased when Vs is increased. Moreover, a waveform of "Vdet" has the shape of a sawtooth wave as shown.

In FIG. 10, "Vs<Vlim" is set and Vs is not influenced by Vlim. In other words, Vdet does not exceed Vs.

Moreover, FIG. 11 shows a state in which Vs is increased as compared with the case of FIG. 10 in order to increase the output voltage, current and power, and Vdet is correspondingly increased. In the same manner as in the case of FIG. 10, "Vs <Vlim" is set.

On the other hand, in FIG. 12, the relationship between Vs and Vlim is reversed. More specifically, Vdet is regulated by Vlim because of "Vs>Vlim". Consequently, Vdet to be originally defined by Vs is defined by Vlim. When Vlim is reduced, a current limitation is increased. Consequently, a current flowing to the switching element 11 is further reduced.

In the structure of FIG. 9, the degree of a reduction in Vlim can be determined by the resistance values of the voltage dividing resistors 20 and 21 and the amount of a current sunk from the terminal "TL" (current suction) by a current mirror formed by an NPN transistor pair.

Figure 13:
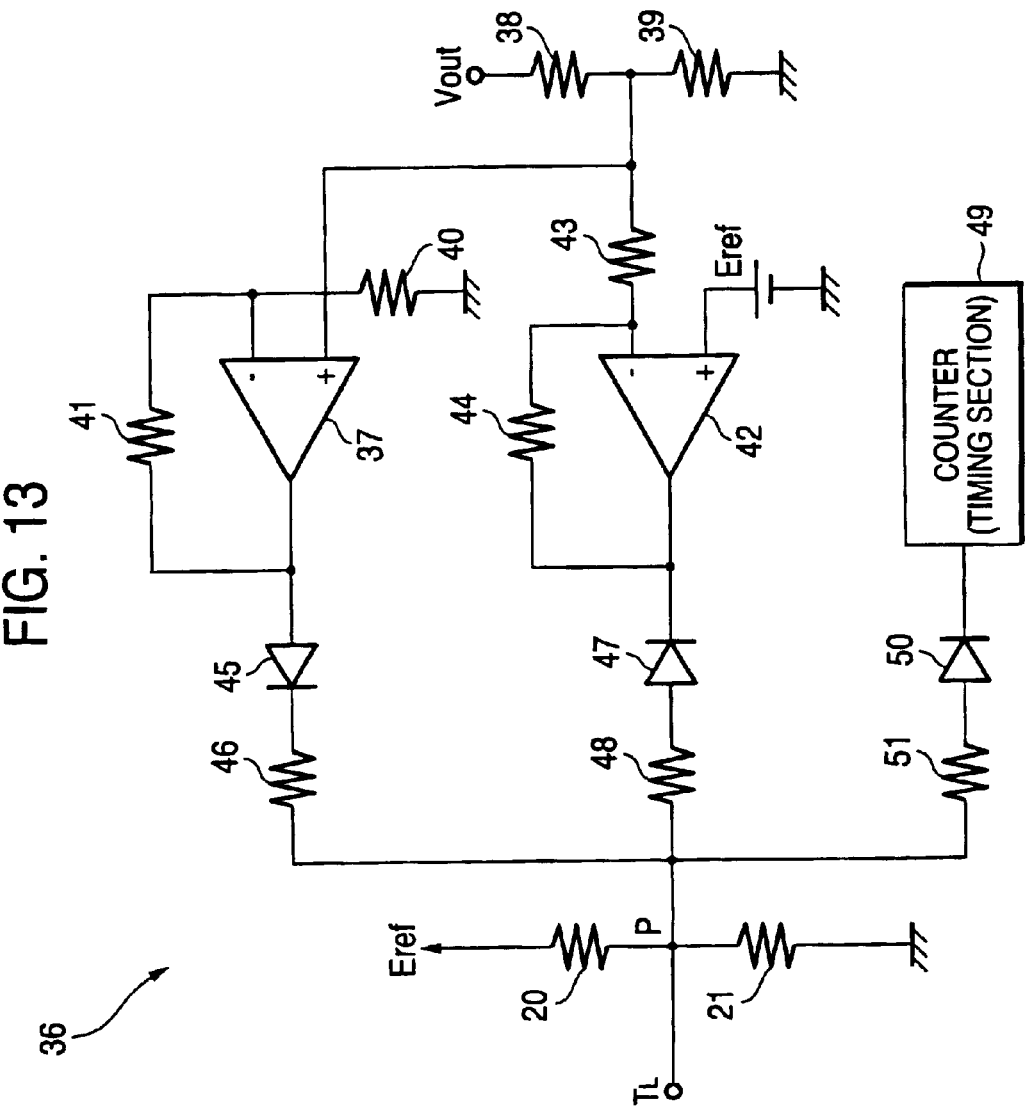
FIG. 13 is a circuit diagram showing an example of a different structure from that of FIG. 9 related to the VDS suppressing circuit.

Moreover, while the Zener diode having a high breakdown voltage is used in FIG. 9, a structure in which the same function is constituted by an element having a low breakdown voltage to be integrated is advantageous on a cost basis. An example 36 of the structure is shown in FIG. 13.

In this circuit, two operational amplifiers and a counter are used. The right portions of the voltage dividing resistors 20 and 21 connected to the terminal "TL" are different from those of the structure in FIG. 9.

The output voltage Vout of the DC—DC converting circuit 3 is divided by resistors 38 and 39 and is supplied to the non-inverted input terminal of the operational amplifier 37. An inverted input terminal is grounded through a resistor 40 and a resistor 41 is provided between the inverted input terminal and an output terminal.

Moreover, the output voltage Vout of the DC—DC converting circuit 3 is divided by the resistors 38 and 39 and is supplied to the non-inverted input terminal of an operational amplifier 42 through a resistor 43. A reference voltage "Eref" indicated as the symbol of a constant voltage source is supplied to a non-inverted input terminal. A resistor 44 is provided between the inverted input terminal and an output terminal.

The output voltages of the operational amplifiers 37 and 42 are applied to the terminal "TL" through diodes and resistors which are provided therein. In other words, the output terminal of the operational amplifier 37 is connected to the anode of a diode 45 and the cathode of the diode 45 is connected to the terminal "TL" through a resistor 46. Moreover, the output terminal of the operational amplifier 42 is connected to the cathode of a diode 47 and the anode of the diode 47 is connected to the terminal "TL" through a resistor 48.

A counter (timing section) 49 is provided for reducing a limited current value for a transition period from the rising start point of a supply voltage Vcc to the stabilization of the supply voltage Vcc. At a point in which a certain time passes after the rising start point of Vcc, a signal having an H level is output. As shown in FIG. 13, the output terminal of the counter 49 is connected to the cathode of a diode 50 and the anode of the diode 50 is connected to the terminal "TL" through a resistor 51.

In this structure, the operational amplifier 42 constitutes an inversion amplifier. Therefore, a lower voltage is output when the output voltage Vout is raised (in other words, which corresponds to the characteristic of the graph G1 in FIG. 6). Referring to the operational amplifier 42, an output voltage can be defined by a positive input voltage and an inversion amplification ratio and the degree of a reduction in the output voltage to an increase in Vout can be set by the resistance value of the resistor 48.

Moreover, the operational amplifier 37 outputs a higher voltage when the output voltage Vout is raised (in other words, which corresponds to the characteristic of the graph G1*u* in FIG. 6). The degree of a change in the output voltage to Vout can be set by the non-inversion amplification ratio of the operational amplifier 37 and the resistance value of the resistor 46.

Since the counter 49 outputs an L level signal before a predetermined time passes after a power-ON time, it serves as a sink for the terminal "TL" and serves to reduce the electric potential of the same terminal (a limited current is reduced). Subsequently, since the counter 49 outputs a signal having an H level, it does not function. Thus, it is preferable that the value of a current flowing to the switching element 11 should be limited until a supply voltage reaches a predetermined voltage. There are proposed a circuit configuration in which means for detecting that the supply voltage reaches the predetermined voltage or not is provided and a circuit configuration in which a timing circuit formed by a timer or a counter is provided.

Figure 14:
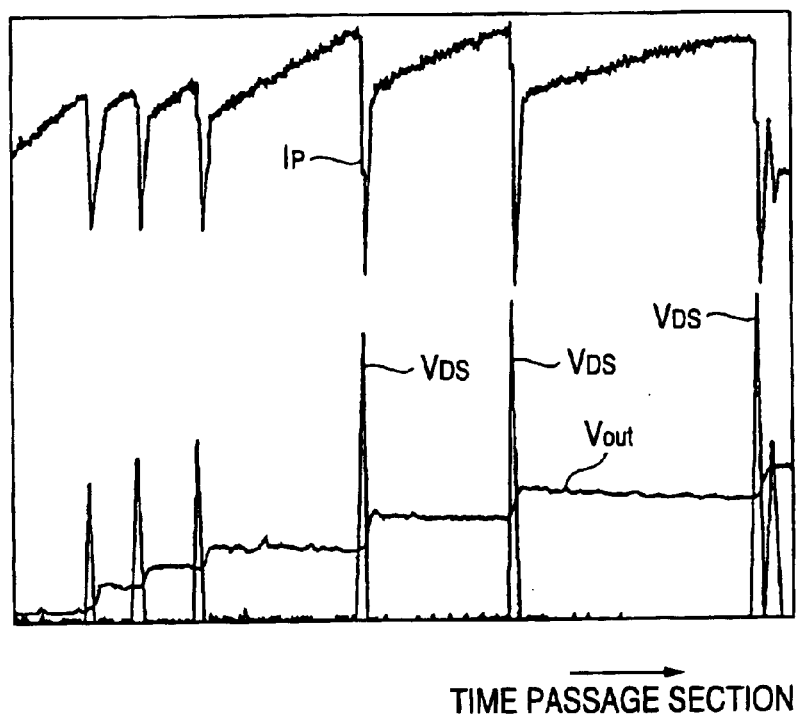
FIG. 14 is a waveform diagram for explaining the effect of the VDS suppressing circuit together with FIG. 15, in which the same circuit is not provided.
Figure 15:
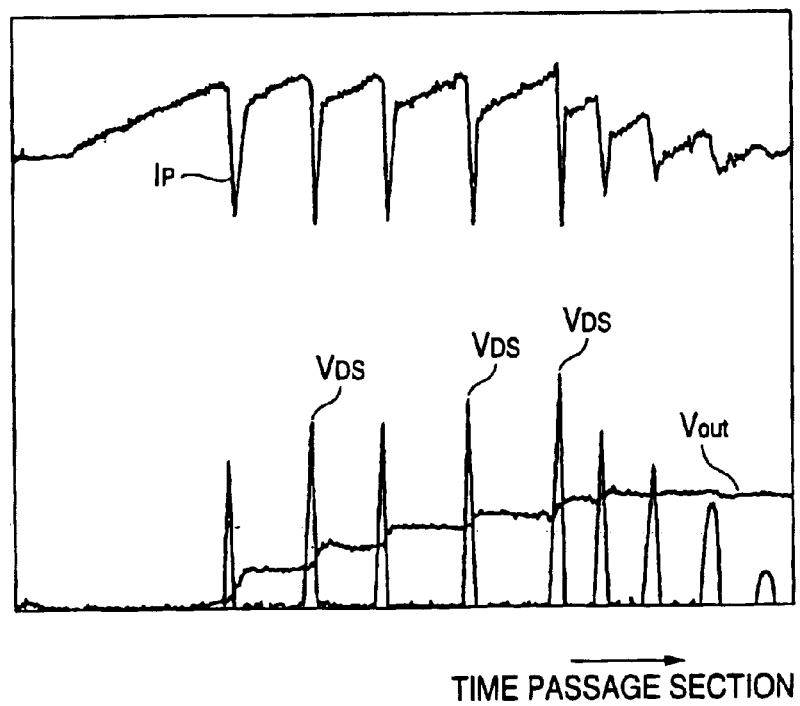
FIG. 15 is a waveform diagram showing the case in which the VDS suppressing circuit is provided.

FIGS. 14 and 15 show an example of measurement for the effects of the VDS suppressing circuit, FIG. 14 showing the case in which the VDS suppressing circuit is not provided and FIG. 15 showing the case in which the VDS suppressing circuit is provided. In these drawings, an axis of abscissa indicates a time and an axis of ordinate indicates Ip, Vout and VDS which are described above.

As is shown by comparing both of the drawings, the magnitude of VDS (a peak value) is suppressed in FIG. 15.

As is apparent from the foregoing, according to the first aspect of the invention, when the output voltage of the DC—DC converting circuit is raised, the current limitation to the switching element is increased so that the voltage applied to the element can be suppressed. Therefore, it is not necessary to use an element having a high breakdown voltage. Moreover, since the winding ratio of the transformer does not need to be increased, it is possible to prevent an electrical efficiency from being deteriorated.

According to the second aspect of the invention, it is possible to set a threshold, thereby changing the degree of the limitation of a current flowing to the switching element. Consequently, it is possible to prevent a bad effect from being produced by uniformly defining the limitation (for example, a sufficient voltage for the ON control of a discharge lamp cannot be obtained).

According to the third aspect of the invention, in such an unstable state that the value of a supply voltage fed to the control circuit is not sufficient, there is a possibility that a voltage applied to the switching element might be raised. By limiting the value of the current flowing to the switching element, therefore, it is possible to suppress the voltage.

What is claimed is:

1. A discharge lamp lighting circuit used for a discharge lamp having a structure of a voltage resonance type comprising:
   a transformer and a switching element provided on a primary side thereof as a DC—DC converting circuit for converting a voltage input from a DC power supply into a predetermined DC voltage; and
   a control circuit operable to ON/OFF control the switching element, thereby controlling an output voltage of the DC—DC converting circuit, and operable to limit current related to the switching element,
   wherein the output voltage of the DC—DC converting circuit is detected and a current flowing to the switching element is limited to be decreased when the output voltage is raised.

2. The discharge lamp lighting circuit according to claim 1, wherein when it is detected that the output voltage of the DC—DC converting circuit is equal to or higher than a predetermined threshold for the output voltage, the control circuit is operable to change a degree of the limitation for the current flowing to the switching element.

3. The discharge lamp lighting circuit according to claim 1, wherein the control circuit is operable to limit a value of the current flowing to the switching element until a supply voltage to be supplied to the control circuit reaches a predetermined voltage.

4. The discharge lamp lighting circuit according to claim 1, wherein said output voltage of the DC—DC converting circuit is detected before turning on the discharge lamp.

5. The discharge lamp lighting circuit according to claim 1, wherein said output voltage of the DC—DC converting circuit is detected after passing a timing of turning on the discharge lamp where a resonance current flows and the output voltage is raised, by which degree of a current limitation is defined.

6. The discharge lamp lighting circuit according to claim 2, wherein said degree of the limitation for the current flowing is set to be constant or relieved.

* * * * *